(12) United States Patent
Ahn et al.

(10) Patent No.: US 11,721,876 B2
(45) Date of Patent: Aug. 8, 2023

(54) BATTERY PACK

(71) Applicant: SAMSUNG SDI CO., LTD., Yongin-si (KR)

(72) Inventors: Jaepil Ahn, Yongin-si (KR); Younghwan Kwon, Yongin-si (KR); Shidong Park, Yongin-si (KR); Chuljung Yun, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 99 days.

(21) Appl. No.: 17/498,875

(22) Filed: Oct. 12, 2021

(65) Prior Publication Data

US 2022/0115755 A1    Apr. 14, 2022

(30) Foreign Application Priority Data

Oct. 12, 2020 (KR) .......................... 10-2020-0131283

(51) Int. Cl.
*H01M 50/557* (2021.01)
*H01M 50/209* (2021.01)
(Continued)

(52) U.S. Cl.
CPC ......... *H01M 50/557* (2021.01); *H01M 10/44* (2013.01); *H01M 50/209* (2021.01); *H01M 50/505* (2021.01)

(58) Field of Classification Search
CPC .. H01M 10/44; H01M 50/204; H01M 50/209; H01M 50/502; H01M 50/505;
(Continued)

(56) References Cited

U.S. PATENT DOCUMENTS 10,644,299 B2    5/2020    Lee et al.
2019/0296309 A1    9/2019    Yang et al.
(Continued)

FOREIGN PATENT DOCUMENTS

JP           2006-190547 A      7/2006
KR    10-2011-0137933 A     12/2011
(Continued)

OTHER PUBLICATIONS

European Office action dated Dec. 1, 2022 for corresponding EP Patent Application No. 21202295.8.
(Continued)

*Primary Examiner* — Victoria H Lynch
(74) *Attorney, Agent, or Firm* — Lee IP Law, P.C.

(57) ABSTRACT

A battery pack is provided. The battery pack includes a battery cell, an input/output terminal electrically connected to the battery cell, the input/output terminal including an upper end portion and a lower end portion in a first direction, and a charge/discharge current of the battery cell being input and output through the input/output terminal, a connector electrically coupled to the input/output terminal, the connector including a fastening portion coupled to the input/output terminal at a fastened height between the upper end portion and the lower end portion of the input/output terminal, and a slider which is slidable in a second direction crossing the first direction, between a first position, at which the slider covers the fastening portion, and a second position, at which the slider exposes the fastening portion, and a fastening member electrically coupling the input/output terminal and the connector to each other.

23 Claims, 11 Drawing Sheets

(51) Int. Cl.
*H01M 50/505* (2021.01)
*H01M 10/44* (2006.01)
(58) Field of Classification Search
CPC ... H01M 50/557; H01M 50/561; H01R 11/12; H01R 4/305; H01R 4/34; Y02E 60/10
See application file for complete search history.

(56) References Cited

U.S. PATENT DOCUMENTS

2019/0305282 A1 10/2019 Jeon
2021/0164511 A1 6/2021 Jeong et al.

FOREIGN PATENT DOCUMENTS

KR 10-2018-0010576 A 1/2018
WO WO 2020/138821 A1 7/2020

OTHER PUBLICATIONS

Extended European Search Report dated Mar. 4, 2022 for corresponding EP Patent Application No. 21202295.8.

BATTERY PACK

CROSS-REFERENCE TO RELATED APPLICATION

This application is based on and claims priority to Korean Patent Application No. 10-2020-0131283, filed on Oct. 12, 2020, in the Korean Intellectual Property Office, the disclosure of which is incorporated by reference herein in its entirety.

BACKGROUND

1. Field

One or more embodiments relate to a battery pack.

2. Description of the Related Art

In general, secondary batteries refer to batteries that can be repeatedly charged and recharged unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or multi-cell secondary batteries (battery packs) each including a plurality of cells connected to each other as a unit are used according to the types of devices that employ secondary batteries.

Small mobile devices such as cellular phones may be operated for a predetermined time using single-cell secondary batteries. However, battery packs having high-output, high-capacity features may be suitable for devices having long operating times and consuming large amounts of power such as electric vehicles and hybrid electric vehicles. The output voltages or currents of battery packs may be increased by adjusting the number of battery cells included in the battery packs.

SUMMARY

According to one or more embodiments, a battery pack may include a battery cell, an input/output terminal through which charge/discharge current of the battery cell is input and output, and a connector coupled to the input/output terminal and electrically connected to the input/output terminal, wherein the input/output terminal includes an upper end portion and a lower end portion in a first direction, wherein the connector includes a fastening portion which is coupled to the input/output terminal at a fastened height between the upper end portion and the lower end portion of the input/output terminal, and a slider which is slidable, in a second direction crossing the first direction, between a first position at which the slider covers the fastening portion and a second position at which the slider exposes the fastening portion, and wherein the battery pack further includes a fastening member which is configured to couple the input/output terminal and the connector to each other.

For example, the input/output terminal may include a guide rail forming the upper end portion of the input/output terminal, and a coupling block forming the lower end portion of the input/output terminal.

For example, the guide rail may support the fastening member at an unfastened position of the fastening member, and the guide rail may guide sliding of the fastening member from the unfastened position to a fastened position.

For example, the guide rail may extend in a third direction crossing the first direction and the second direction.

For example, the guide rail may include a pair of guide rails formed at positions facing each other in the second direction.

For example, the guide rail may include an upper guide rail and a lower guide rail which face each other in the first direction.

For example, the upper guide rail and the lower guide rail may extend in a third direction crossing the first direction and the second direction, and an extension length of the upper guide rail may be greater than an extension length of the lower guide rail.

For example, the upper guide rail and the lower guide rail may include an insulating material.

For example, the fastening member may include a guide piece configured to be inserted between the upper guide rail and the lower guide rail, and a screw extending in the first direction across the guide piece.

For example, the guide piece may include a pair of guide pieces which are provided on both sides of the fastening member in the second direction and configured to be inserted between the upper and lower guide rails each including a pair of guide rails formed at positions facing each other in the second direction.

For example, a conductive bar electrically connected to the battery cell may be connected to the coupling block.

For example, the coupling block may include an upper surface formed as a conductive surface to allow charge/discharge current to flow therethrough.

For example, an insertion space into which the connector is to be inserted may be formed above the upper surface of the coupling block.

For example, the upper surface of the coupling block may have a height corresponding to the fastened height.

For example, the input/output terminal may further include sidewalls surrounding the coupling block and the fastening member.

For example, the sidewalls may include first and second sidewalls which face each other in a third direction crossing the first direction and the second direction, and third and fourth sidewalls which face each other in the second direction, wherein an insertion hole for receiving the connector may be formed in at least one of the third and fourth sidewalls, and wherein the first to fourth sidewalls may form an external shape of the input/output terminal as a rectangular parallelepiped shape together with the upper end portion and the lower end portion of the input/output terminal.

For example, the connector may further include an accommodation block and a slider rail on the accommodation block, and the slider rail is formed for supporting movement of the slider.

For example, when the slider is at the first position, the slider may be outside the accommodation block and may cover the fastening portion, and when the slider is at the second position, the slider may be accommodated in the accommodation block and may expose the fastening portion.

For example, the fastening portion may be formed at an end portion of the connector, the end portion corresponding to a front end of the connector in the second direction, and the fastening portion and the accommodation block may be sequentially formed from the end portion of the connector.

For example, the slider may include a manipulation portion exposed from the slider rail of the accommodation block.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
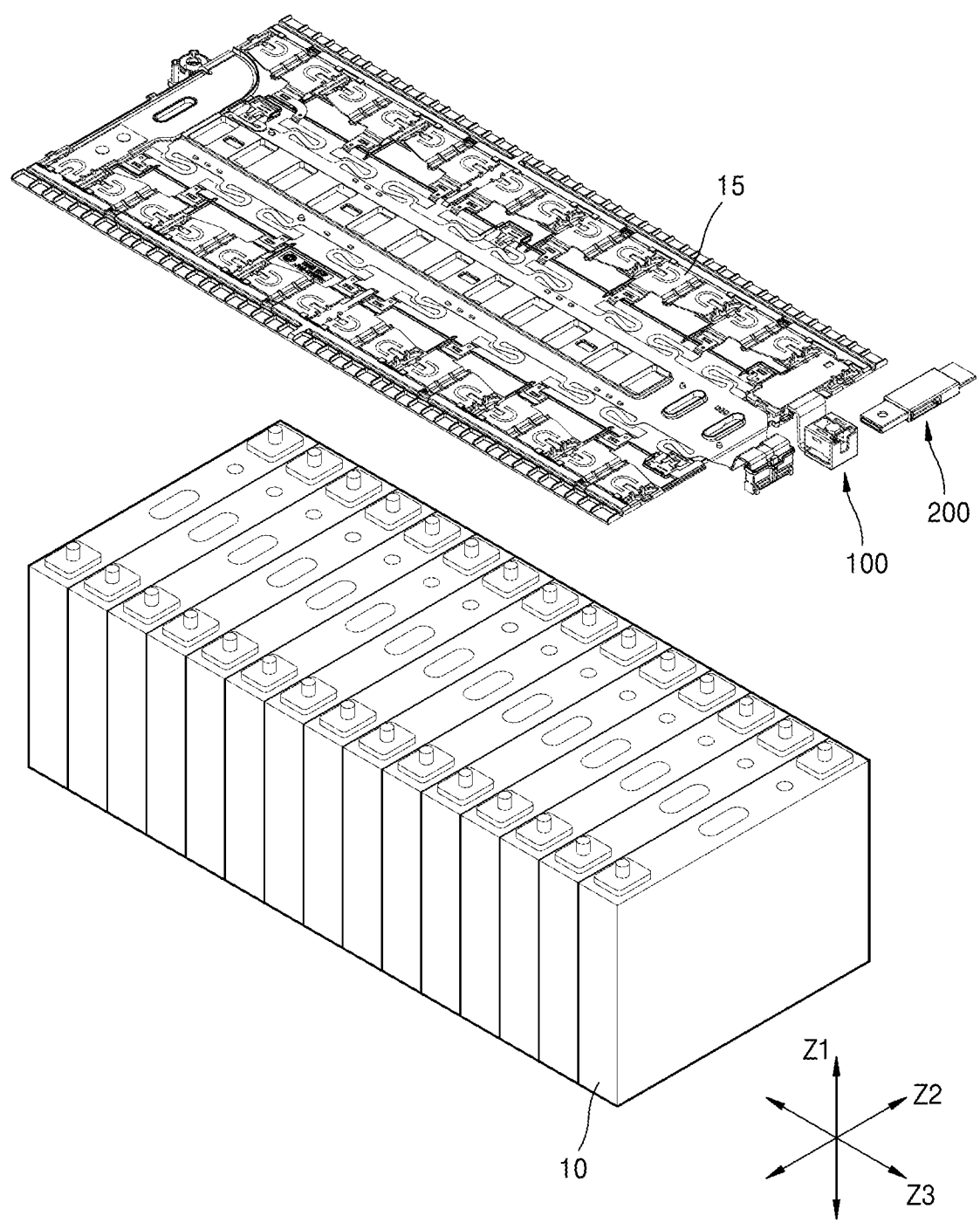
FIG. 1 is an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, or one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Hereinafter, a battery pack will be described according to embodiments with reference to the accompanying drawings.

Figure 2A:
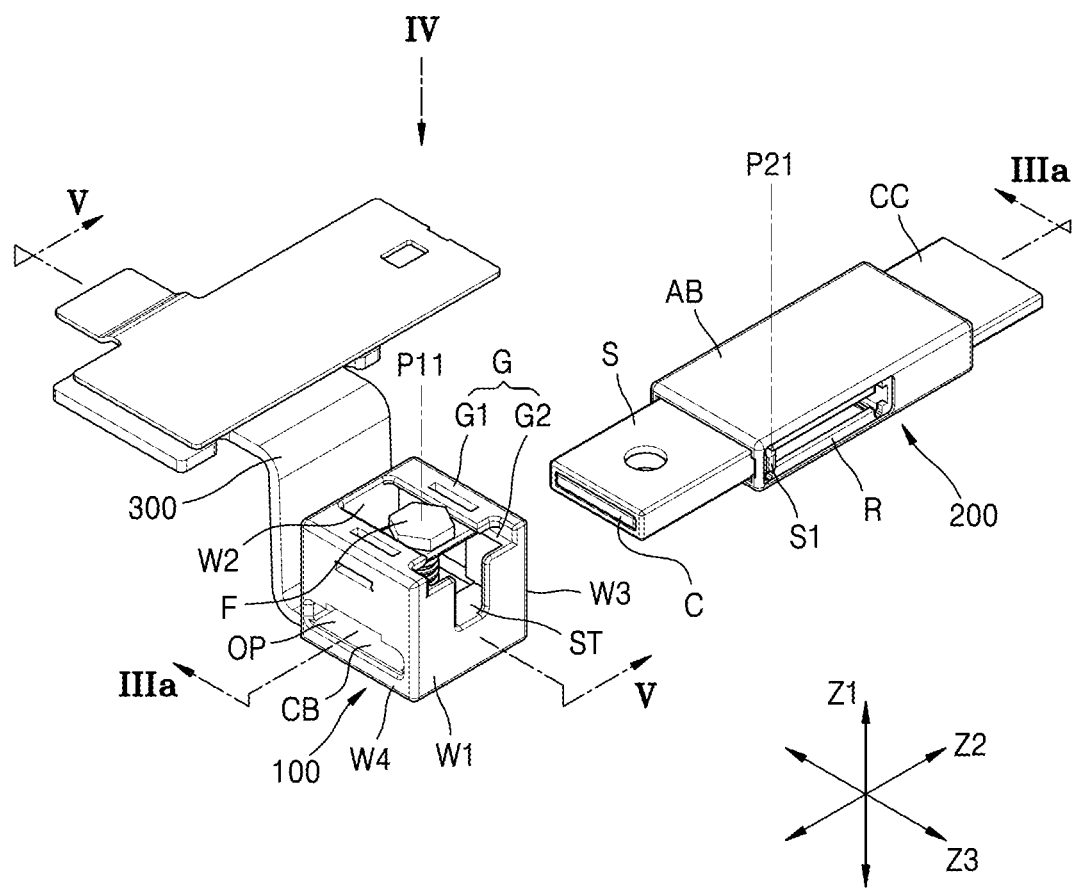
FIG. 2A is a perspective view of an input/output terminal and a connector which are illustrated in FIG. 1, the input/output terminal and the connector being in a state in which the input/output terminal and the connector are not fastened to each other with a fastening member being at an unfastened position.
Figure 2B:
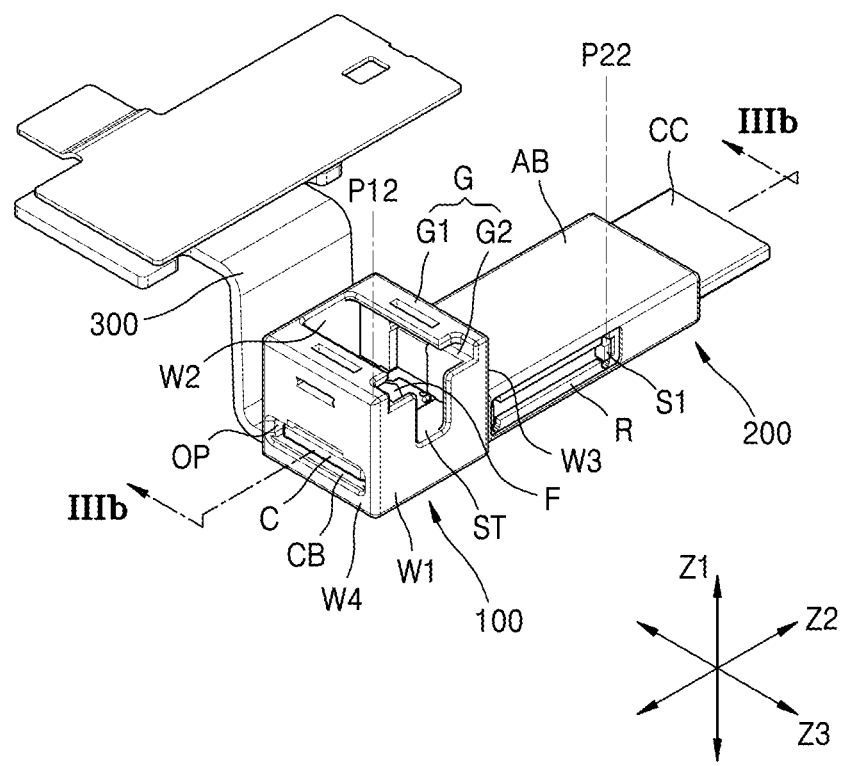
FIG. 2B is a perspective view of the input/output terminal and the connector which are shown in FIG. 1, the input/output terminal and the connector being in a state in which the input/output device and the connector are fastened to each other with the fastening member being at a fastened position.
Figure 3A:
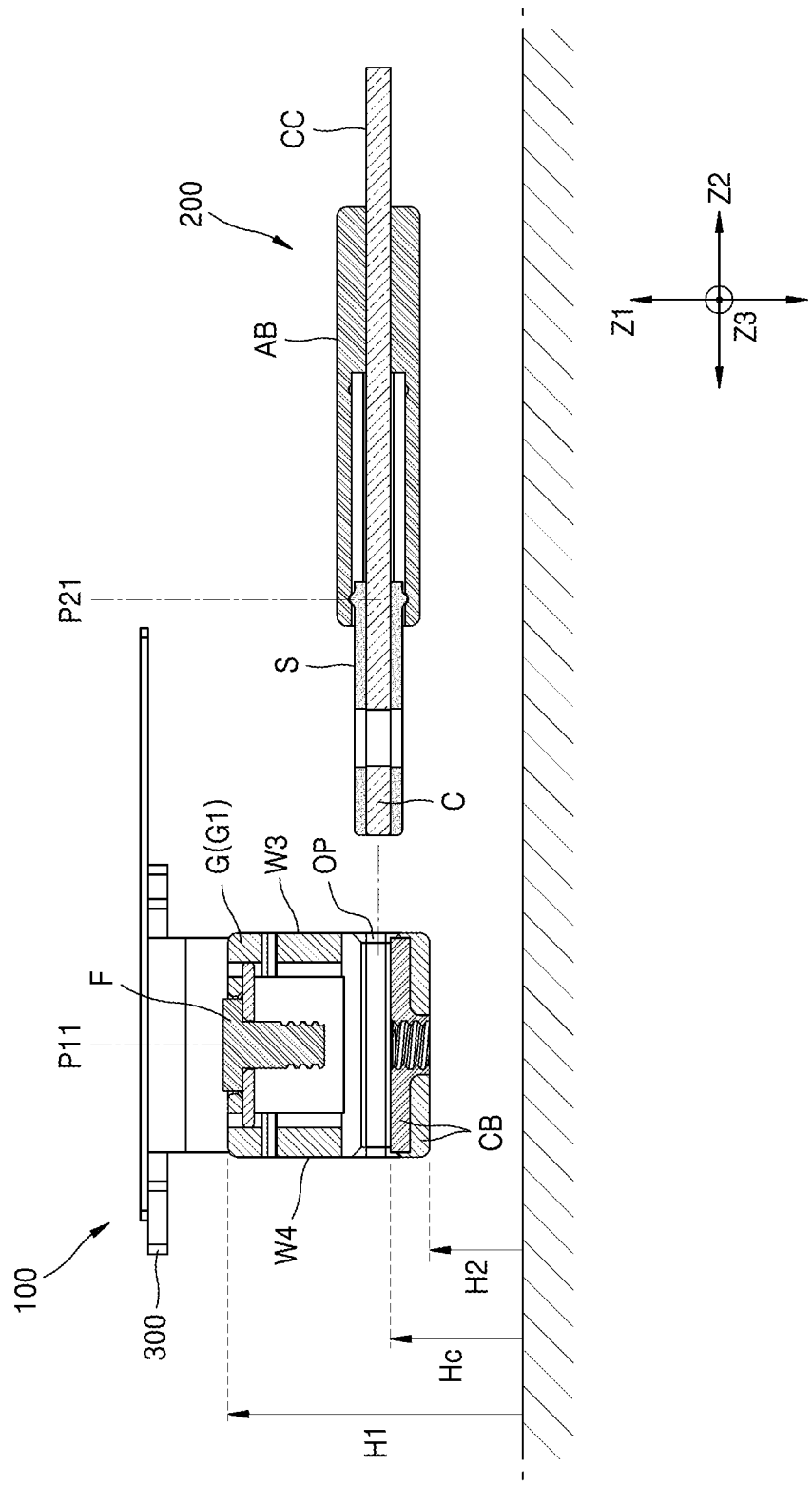
FIG. 3A is a cross-sectional view taken along line IIIa-IIIa of FIG. 2A.
Figure 3B:
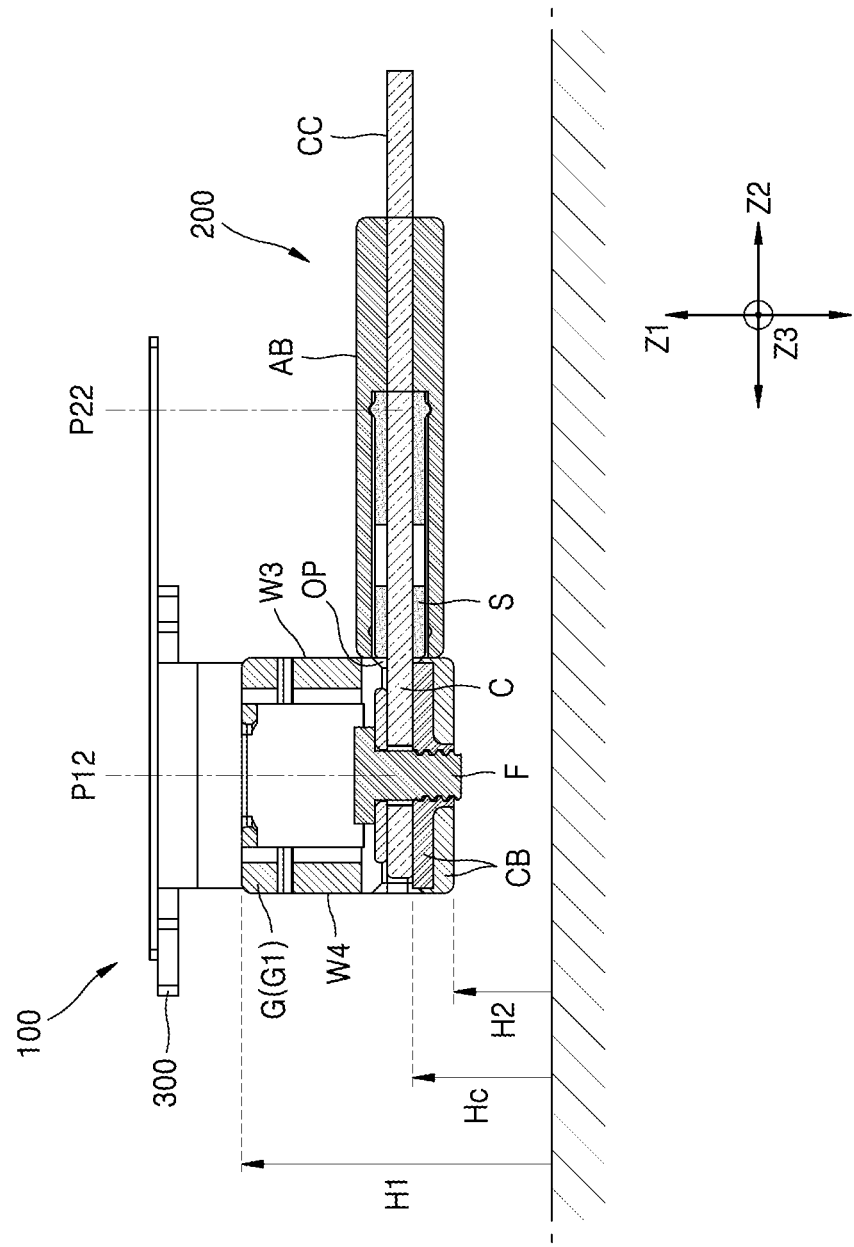
FIG. 3B is a cross-sectional view taken along line IIIb-IIIb of FIG. 2B.
Figure 4:
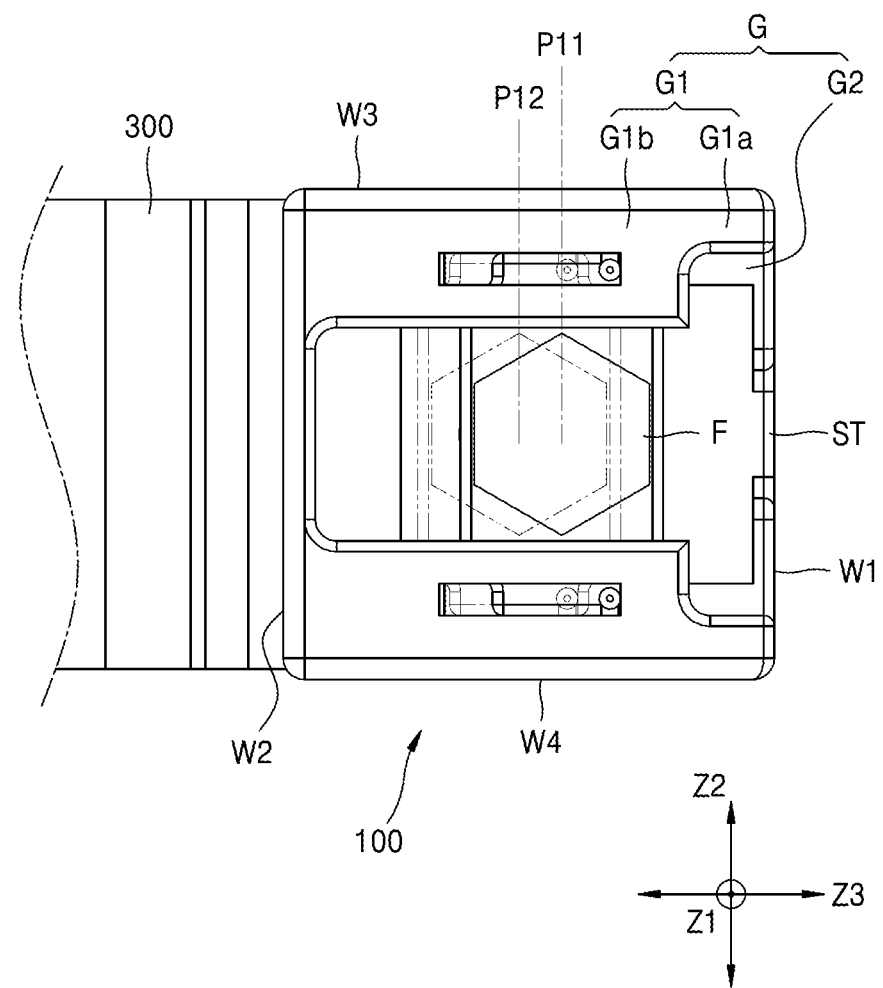
FIG. 4 is a view of the input/output terminal in a direction IV shown in FIG. 2A, illustrating the unfastened position and the fastened position of the fastening member.
Figure 5:
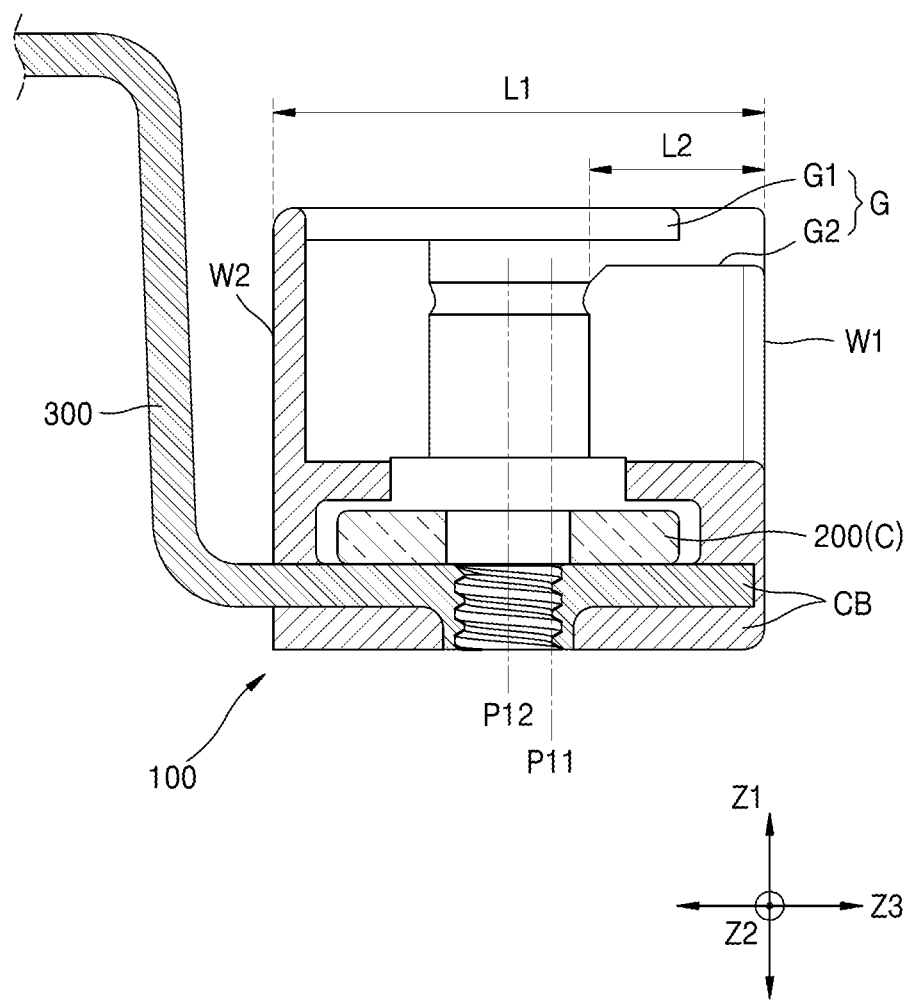
FIG. 5 is a cross-sectional view taken along line V-V of FIG. 2A, illustrating the unfastened position and the fastened position of the fastening member.
Figure 6:
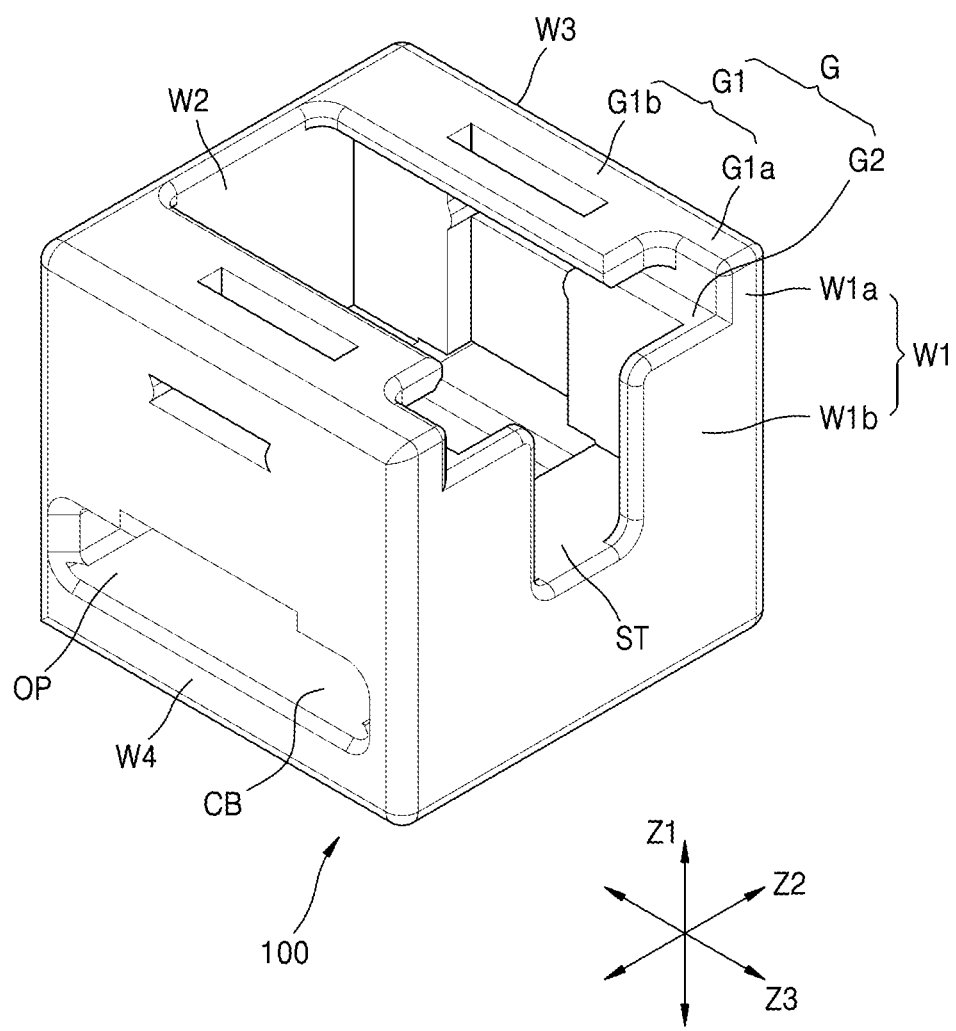
FIG. 6 is an enlarged perspective view of the input/output terminal in FIG. 2A.
Figure 7A:
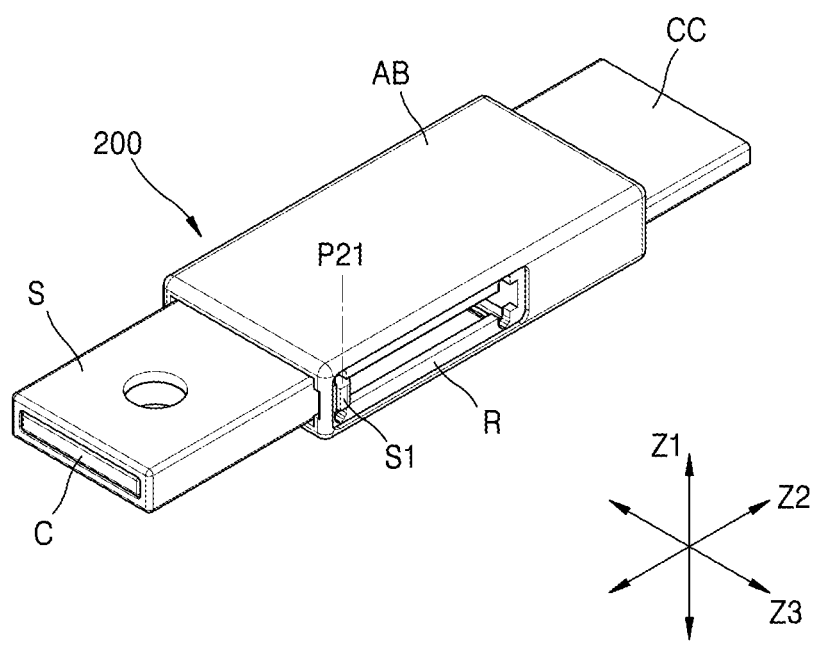
FIG. 7A is a perspective view of the connector shown in FIG. 2A.
Figure 7B:
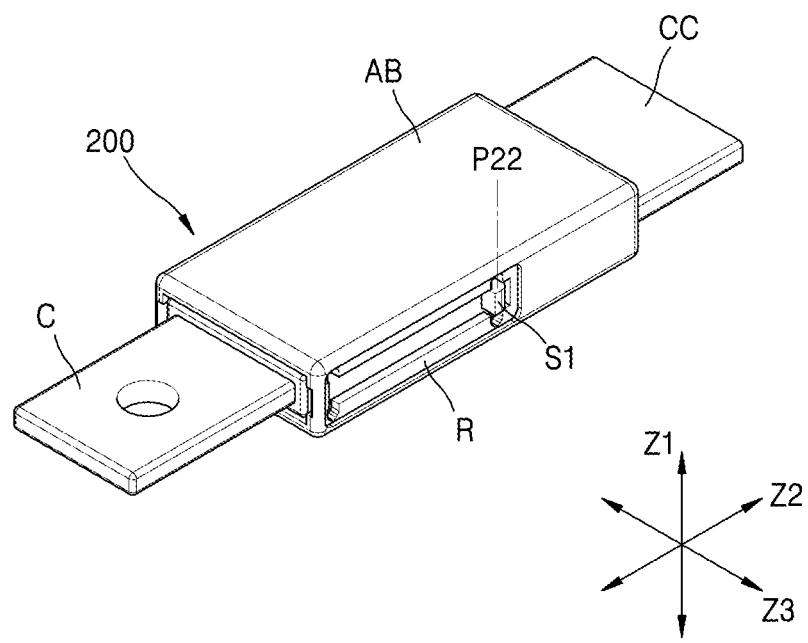
FIG. 7B is a perspective view of the connector shown in FIG. 2B.
Figure 8:
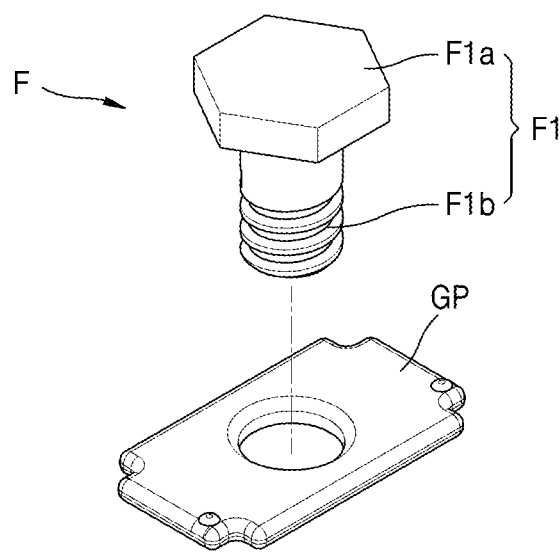
FIG. 8 is an exploded perspective view of the fastening member in FIG. 2A.
Figure 8:
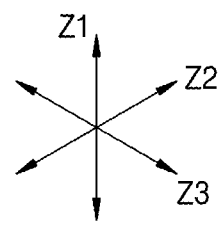

FIG. 1 is an exploded perspective view illustrating a battery pack according to an embodiment. FIG. 2A is a perspective view illustrating an input/output terminal 100 and a connector 200 in FIG. 1, with the input/output terminal 100 and the connector 200 being in a state in which the input/output terminal 100 and the connector 200 are not fastened to each other with a fastening member F being at an unfastened position P11. FIG. 2B is a perspective view illustrating the input/output terminal 100 and the connector 200 in FIG. 1, with the input/output terminal 100 and the connector 200 being in a state in which the input/output terminal 100 and the connector 200 are fastened to each other with the fastening member F being at a fastened position P12. FIG. 3A is a cross-sectional view taken along line of FIG. 2A. FIG. 3B is a cross-sectional view taken along line IIIb-IIIb of FIG. 2B. FIG. 4 is a view of the input/output terminal 100 in the direction IV in FIG. 2A (as viewed in a top view), illustrating the unfastened position P11 and the fastened position P12 of the fastening member F. FIG. 5 is a cross-sectional view taken along line V-V of FIG. 2A, illustrating the unfastened position P11 and the fastened position P12 of the fastening member F. FIG. 6 is an enlarged perspective view illustrating the input/output terminal 100 shown in FIG. 2A. FIG. 7A is a perspective view illustrating the connector 200 shown in FIG. 2A. FIG. 7B is a perspective view illustrating the connector 200 shown in FIG. 2B. FIG. 8 is an exploded perspective view illustrating the fastening member F shown in FIG. 2A.

Referring to FIG. 1, according to an embodiment, the battery pack may include a plurality of battery cells 10 which are electrically connected to each other, the input/output terminal 100 through which charge/discharge current of the plurality of battery cells 10 is input or output, and the connector 200, which is electrically coupled to the input/output terminal 100.

According to an embodiment, the battery pack may include the plurality of battery cells 10. For example, the plurality of battery cells 10 of the battery pack may be electrically connected to each other through bus bars 15. For example, according to an embodiment, every two adjacent battery cells 10 may be electrically connected to each other through one bus bar 15. In addition, the input/output terminal 100 may be, e.g., electrically, connected to at least one of both end battery cells 10, which are positioned at both ends of the plurality of battery cells 10 electrically connected to each other. For example, the input/output terminal 100 may be connected to an electrode of a first end of the battery cell 10 having the lowest potential and forming one of both ends of a charge/discharge path of the battery cells 10 electrically connected to each other, an electrode of a second end of the battery cell 10 having the highest potential and forming the other of both the ends of the charge/discharge path, or the bus bar 15 connected to the electrode having the lowest potential and the electrode having the highest potential.

Referring to FIGS. 1 to 2B, in an embodiment, the input/output terminal 100 and the connector 200 may be electrically connected to each other as being, e.g., electrically and physically, coupled to each other using the fastening member F, and the charge/discharge path of the battery cell 10 may be formed as the input/output terminal 100 connected to the battery cells 10 (a group of battery cells 10) is connected to the connector 200 connected to, e.g., an external load, an external charger, or another group of battery cells 10.

Referring to FIGS. 3A and 3B, the input/output terminal 100 may include an upper end portion and a lower end portion in a first direction Z1, and a fastened height Hc at which the input/output terminal 100 and the connector 200 are fastened to each other may be between a first height H1 of the upper end portion of the input/output terminal 100 in the first direction Z1 and a second height H2 of the lower end portion of the input/output terminal 100 in the first direction Z1. Here, the fastened height Hc is a height at which the input/output terminal 100 and the connector 200 are fastened to each other in the first direction Z1, e.g., the fastened height Hc may be a height at which the input/output terminal 100 and the connector 200 are coupled to each other by the fastening member F while, e.g., directly, contacting each other in an overlapping manner.

As described later, the fastening member F may be coupled to the connector 200, which is inserted into the input/output terminal 100 in a second direction Z2 and placed on an upper surface of a coupling block CB of the input/output terminal 100 such that the input/output terminal 100 and the connector 200 may be fastened to each other on the upper surface of the coupling block CB of the input/output terminal 100. Thus, in an embodiment, the fastened height Hc may correspond to the height of the upper surface of the coupling block CB of the input/output terminal 100, and the height of the upper surface of the coupling block CB of the input/output terminal 100, which forms the fastened height Hc, may be between the first height H1 of the upper end portion of the input/output terminal 100 and the second height H2 of the lower end portion of the input/output terminal 100. For example, the height of the upper surface of the coupling block CB (corresponding to the fastened height Hc) may be between the height (corresponding to the first height H1) of a guide rail G forming the upper end portion of the input/output terminal 100 and the height (corresponding to the second height H2) of the coupling block CB (for example, a lower surface of the coupling block CB) forming the lower end portion of the input/output terminal 100.

As described later, the input/output terminal 100 and the connector 200 may be coupled to each other by coupling the fastening member F to the connector 200, which is inserted into the input/output terminal 100 in the second direction Z2 crossing the first direction Z1. In this case, the second direction Z2 may correspond to a direction crossing the first direction Z1, and in an embodiment, the second direction Z2 may correspond to a direction perpendicular to the first direction Z1.

Referring to FIGS. 4 and 5, the input/output terminal 100 may include the guide rail G which forms the upper end portion of the input/output terminal 100 in the first direction Z1, and the coupling block CB, which forms the lower end portion of the input/output terminal 100 in the first direction Z1. The guide rail G is configured to support the fastening member F, which is used to couple the input/output terminal 100 and the connector 200 to each other, and to this end, the guide rail G may properly maintain the fastening member F at the unfastened position P11 and may guide sliding of the fastening member F from the unfastened position P11 to the fastened position P12. For example, the guide rail G may extend in a third direction Z3, which crosses the first and second directions Z1 and Z2, and may support sliding of the fastening member F in the third direction Z3. That is, the unfastened position P11 and the fastened position P12 of the fastening member F may be different positions which are spaced apart from each other in the third direction Z3 (e.g., the dashed lines of the unfastened position P11 and the fastened position P12 in FIGS. 4 and 5 correspond to the central vertical axis along the first direction Z1 of the fastening member F in each of the positions). The third direction Z3 may correspond to a direction crossing the first and second directions Z1 and Z2, and in an embodiment, the third direction Z3 may be perpendicular to the first and second directions Z1 and Z2.

The guide rail G may include a pair of guide rails G at positions facing each other in the second direction Z2. As described later, the pair of guide rails G may be formed on third and fourth sidewalls W3 and W4, which form the outer periphery of the input/output terminal 100, and face each other in the second direction Z2. As described above, the pair of guide rails G formed at mutually-facing positions may stably support the fastening member F from both sides. As described later, the fastening member F may include a guide piece GP (refer to FIG. 8), which is formed on both sides in the second direction Z2, and the guide piece GP formed on both sides may be stably supported by the pair of guide rails G which are formed at the positions facing each other in the second direction Z2.

The guide rail G may include an upper guide rail G1 and a lower guide rail G2, which face each other in the first direction Z1, e.g., the upper guide rail G1 and the lower guide rail G2 may vertically overlap each other, and the fastening member F may be supported between the upper guide rail G1 and the lower guide rail G2 such that the fastening member F may not be unintentionally moved in the first direction Z1 away from the unfastened position P11 between the upper guide rail G1 and the lower guide rail G2. In addition, while sliding from the unfastened position P11 as being guided between the upper guide rail G1 and the lower guide rail G2, the fastening member F may reach the fastened position P12 away from the lower guide rail G2. In this case, the upper guide rail G1 and the lower guide rail G2 may respectively include a pair of upper guide rails G1 and a pair of lower guide rails G2, which extend in the third direction Z3 crossing the first and second directions Z1 and Z2 and face each other.

In an embodiment, the upper guide rail G1 and the lower guide rail G2 may extend in the third direction Z3, and a first extension length L1 of the upper guide rail G1 and a second extension length L2 of the lower guide rail G2 may be different from each other. For example, as illustrated in FIG. 5, the first extension length L1 of the upper guide rail G1 may extend along the third direction Z3 along an entirety of the top of the input/output terminal 100, and the second extension length L2 of the lower guide rail G2 may extend along the third direction Z3 only partially along the top of the input/output terminal 100. At the unfastened position P11, the fastening member F may be supported between the upper guide rail G1 and the lower guide rail G2 in a state in which the fastening member F is spaced apart from the upper guide rail G1 but is in contact with the lower guide rail G2 and supported on the lower guide rail G2 due to the weight of the fastening member F, and when the fastening member F slides in the third direction Z3 from the unfastened position P11 to the fastened position P12, the fastening member F may be guided to the fastened position P12 as falling in the first direction Z1 from the lower guide rail G2, which ends at the fastened position P12.

For example, referring to FIG. 5, at the unfastened position P11, the fastening member F may be position on the top surface of the lower guide rail G2 (corresponding to the second extension length L2), without contacting the upper guide rail G1 thereabove. Once the fastening member F slides in the third direction Z3, e.g., toward a center of the input/output terminal 100, the fastening member F may drop from the lower guide rail G2 along the first direction Z1 to be positioned in the fastened position P12, e.g., in the center of the bottom portion of the input/output terminal 100.

As described above, the lower guide rail G2 may end at the fastened position P12, but the upper guide rail G1 may extend further away from the fastened position P12 in the third direction Z3, such that the first extension length L1 of the upper guide rail G1 may be greater than the second extension length L2 of the lower guide rail G2. The upper guide rail G1 may form the upper end portion of the input/output terminal 100 and may insulate, from the surrounding environment, inner conductive members, e.g., the fastening member F, the coupling block CB, and a fastening portion C of the connector 200, which are placed inside the input/output terminal 100. For example, the upper guide rail G1 may prevent a short circuit between a conductive member in the input/output terminal 100 and an external conductor or a part of a person approaching from the outside of the input/output terminal 100, thereby preventing the flow of charge/discharge current to the external conductor or the part of the person caused by the short circuit between the conductive member in the input/output terminal 100 and the external conductor or the part of the person. The upper guide rail G1 serving as an insulator may be longer than the lower guide rail G2, and thus, an external conductor or a part of a person may be effectively blocked.

In an embodiment, the upper guide rail G1 may be formed along the total length of the input/output terminal 100 in the third direction Z3 and may extend longer than the lower guide rail G2. The first extension length L1 of the upper guide rail G1 may be larger than the second extension length L2 of the lower guide rail G2 along the third direction Z3, i.e., L1>L2. For example, the lower guide rail G2 may only partially overlap the upper guide rail G1 in the first direction Z1, i.e., in the vertical direction, and it may end at the fastened position P12, e.g., facing portions of the lower guide rail G2 may be spaced apart from each other along the second direction Z2 to accommodate a width of the fastening member F therebetween.

In an embodiment, the upper guide rail G1 may have different, e.g., varying, widths in the second direction Z2. Here, the width of the upper guide rail G1 refers to a size in the second direction Z2 and may be the size of the pair of upper guide rails G1 of the upper guide rail G1 in the second direction Z2 in which the pair of upper guide rails G1 face each other. As illustrated in FIGS. 4 and 6, the upper guide rail G1 may include a narrow portion G1a having a relatively small width in the second direction Z2 and a wide portion G1b having a relatively large width in the second direction Z2. In this case, the narrow portion G1a and the wide portion G1b of the upper guide rail G1 may extend respectively from an end portion and the other end portion of the input/output terminal 100 in the third direction Z3, i.e., the narrow portion G1a and the wide portion G1b may extend from respective first and second sidewalls W1 and W2 of the input/output terminal 100 to contact each other. For example, the narrow portion G1a may extend from a first end portion, e.g., the first sidewall W1, of the input/output terminal 100 close to the unfastened position P11 of the fastening member F, and the wide portion G1b may extend from a second end portion, e.g., from the second sidewall W2, of the input/output terminal 100 close to the fastened position P12 of the fastening member F. The wide portion G1b may have a relatively large width such that the fastening member F may be securely protected, e.g., at least partially overlapped in a top view, at the fastened position P12 from the surrounding environment, and the narrow portion G1a may have a relatively small width to provide, e.g., an assembly space for the fastening member F such that the fastening member F may be easily inserted and assembled between the upper guide rail G1 and the lower guide rail G2.

For example, as illustrated in FIG. 4, the upper guide rail G1 may include, in the third direction Z3, the narrow portion G1a and the wide portion G1b, and may extend along the total length of the input/output terminal 100 in the third direction Z3, e.g., from the first sidewall W1 forming the first end portion of the input/output terminal 100 to the second sidewall W2 forming the second end portion of the input/output terminal 100. In another example, the upper guide rail G1 may not be formed throughout the total length of the input/output terminal 100 in the third direction Z3, e.g., the upper guide rail G1 may extend in the third direction Z3 from the second end portion (close to the fastened position P12) but may not reach the first end portion (close to the unfastened position P11). For example, the upper guide rail G1 may end at a position which is spaced apart from the first end portion (e.g., from the first sidewall W1) of the input/output terminal 100 by a predetermined distance, such that the assembly space may be formed for the fastening member F to be easily inserted and assembled between the upper guide rail G1 and the lower guide rail G2.

The upper guide rail G1 and the lower guide rail G2 may support and guide the fastening member F through which charge/discharge current may flow when the input/output terminal 100 and the connector 200 are coupled to each other through the fastening member F. The upper guide rail G1 and the lower guide rail G2 may include an insulating material, e.g., a resin material, for insulation from the fastening member F or the surrounding environment.

Referring to FIG. 6, the input/output terminal 100 may include the first, second, third, and fourth sidewalls W1, W2, W3, and W4, which form end portions of the input/output terminal 100 to surround conductive members arranged inside the input/output terminal 100. For example, the input/output terminal 100 may include the first and second sidewalls W1 and W2 which form the first and second end portions of the input/output terminal 100 in the third direction Z3, and the third and fourth sidewalls W3 and W4 which form third and fourth end portions of the input/output terminal 100 in the second direction Z2. Because the input/output terminal 100 includes the first to fourth sidewalls W1, W2, W3, and W4 forming the first to fourth end portions in the second and third directions Z2 and Z3, the input/output terminal 100 may surround conductive members arranged therein. In an embodiment, the input/output terminal 100 includes the first to fourth sidewalls W1, W2, W3, and W4 having a plate shape and extending in the second direction Z2 or the third direction Z3, and may thus have an approximately quadrangular, e.g., rectangular, outer shape. The first to fourth sidewalls W1, W2, W3, and W4 may surround conductive members arranged inside the input/output terminal 100, e.g., the fastening member F and the coupling block CB. That is, the first to fourth sidewalls W1, W2, W3, and W4 may surround the fastening member F at the unfastened position P11 and the fastened position P12, and may also surround the coupling block CB.

The coupling block CB is a portion of the input/output terminal 100 at which the input/output terminal 100 is electrically connected to the connector 200 and which is surrounded by the first to fourth sidewalls W1, W2, W3, and W4. The coupling block CB may form the lower end portion of the input/output terminal 100, which is surrounded by the first to fourth sidewalls W1, W2, W3, and W4. For example, the input/output terminal 100 may include the guide rail G forming the upper end portion of the input/output terminal 100, the coupling block CB forming the lower end portion of the input/output terminal 100, and the first to fourth sidewalls W1, W2, W3, and W4 connecting the upper and lower end portions to each other, and approximately have a rectangular parallelepiped shape.

In an embodiment, as illustrated in FIG. 6, the first sidewall W1 may have different widths in the second direction Z2. For example, the first sidewall W1 may include a narrow portion W1a having a relatively small width in the second direction Z2, and a wide portion W1b having a relatively large width in the second direction Z2. In this case, the narrow portion W1a and the wide portion W1b of the first sidewall W1 may be respectively formed at an upper position relatively close to the narrow portion G1a of the upper guide rail G1 in the first direction Z1 and at a position relatively far from the narrow portion G1a of the upper guide rail G1 in the first direction Z1. In an embodiment, the narrow portion W1a of the first sidewall W1 and the narrow portion G1a of the upper guide rail G1 may be in, e.g., direct, contact with each other and may have relatively small widths to provide the assembly space for assembling the fastening member F, thereby making it easy to assemble the fastening member F. For example, the narrow portion W1a of the first sidewall W1 and the narrow portion G1a of the upper guide rail G1 may be closer to the unfastened position P11 of the fastening member F than to the fastened position P12 of the fastening member F.

A slot ST may be formed in the first sidewall W1. For example, the slot ST may extend longitudinally along in the first direction Z1 in the wide portion W1b of the first sidewall W1. The slot ST may be formed to be long in the first direction Z1 by considering the work of checking the internal state of the input/output terminal 100, e.g., the fastening state of the fastening member F, and rework when the fastening state of the fastening member F is not good. For example, the slot ST may extend in the first direction Z1 from an upper end portion of the first sidewall W1 (an upper end portion of the wide portion W1b of the first sidewall W1) and may, as a whole, have a long hole shape, which has an open upper side and is long in the first direction Z1.

The third and fourth sidewalls W3 and W4 may be symmetrical to each other and may support the guide rail G formed in the third direction Z3. Insertion holes OP may be formed in, e.g., each of, the third and fourth sidewalls W3 and W4 to allow insertion of the connector 200 in the second direction Z2. Referring to FIGS. 3A and 3B, the insertion holes OP may be formed between the first height H1 of the upper end portion of the input/output terminal 100 and the second height H2 of the lower end portion of the input/output terminal 100, and in this case, the insertion holes OP may be formed at a height closer to the second height H2, at which the coupling block CB forms the lower end portion of the input/output terminal 100, than to the first height H1 of the upper end portion of the guide rail G. In an embodiment, the insertion holes OP may be formed at a height including at least the height of the upper surface of the coupling block CB, which forms the fastened height Hc. As described later, the coupling block CB forms an electrical connection with the connector 200, and the insertion holes OP, into which the connector 200 is to be inserted, may be formed at a height close to the coupling block CB. In various embodiments, the insertion holes OP for receiving the connector 200 may be formed in both of the third and fourth sidewalls W3 and W4, or an insertion hole OP for receiving the connector 200 may be formed in at least one of the third and fourth sidewalls W3 and W4.

Referring to FIG. 5, a conductive bar 300 connected to the battery cells 10 may be coupled to the coupling block CB, which forms the lower end portion of the input/output terminal 100. For example, the conductive bar 300 may be connected to an electrode of the end battery cell 10 having the lowest potential and forming one of both ends of the charge/discharge path of the battery cells 10 (a group of battery cells 10) electrically connected to each other, an electrode of the other end battery cell 10 having the highest potential and forming the other of both the ends of the charge/discharge path, or the bus bar 15 connected to the electrode having the lowest potential or the electrode having the highest potential.

The upper surface of the coupling block CB in the first direction Z1 may be exposed upward for electrical connection with the connector 200 and may be formed as a conductive surface to allow the flow of charge/discharge current therethrough and make an electrical connection with the connector 200. Here, the expression "the upper surface of the coupling block CB is exposed upward" may mean that no other structure than the connector 200 is arranged on the upper surface of the coupling block CB for coupling with the connector 200, and an insertion space is formed above the upper surface of the coupling block CB for the insertion of the connector 200.

The upper surface of the coupling block CB in the first direction Z1 may be formed as a conductive surface which is electrically connected to the conductive bar 300 connected to the battery cells 10. In various embodiments, a portion of the conductive bar 300 may be exposed to form the upper surface of the coupling block CB as a conductive surface, or a conductive plate electrically connected to the conductive bar 300 may form the upper surface of the coupling block CB as a conductive surface.

Referring to FIGS. 6 to 7B, the insertion holes OP, into which the connector 200 is to be inserted, may be formed between the guide rail G forming the upper end portion of the input/output terminal 100 in the first direction Z1 and the coupling block CB forming the lower end portion of the input/output terminal 100 in the first direction Z1. The connector 200 inserted into the input/output terminal 100 through the insertion holes OP may be placed on the upper surface of the coupling block CB, and the connector 200 and the upper surface of the coupling block CB may be electrically connected to each other while overlapping each other and may directly contact each other by the fastening force of the fastening member F, which is inserted through the connector 200 and coupled to the upper surface of the coupling block CB.

The connector 200 may be inserted through the insertion holes OP of the input/output terminal 100 and may be conductively coupled to the upper surface of the coupling block CB of the input/output terminal 100. The connector 200 may be inserted into the input/output terminal 100 in the second direction Z2 by inserting the connector 200 into the input/output terminal 100 through the insertion holes OP of the third and fourth sidewalls W3 and W4, which form the end portions of the input/output terminal 100 in the second direction Z2. For example, the connector 200 coupled to the input/output terminal 100 may extend in the second direction Z2. In the present specification, the expression "the connector 200 extends in the second direction Z2" may mean that the connector 200 extends in the second direction Z2 relative to the structure of the input/output terminal 100 described above with reference to the first to third directions Z1 to Z3, e.g., a longitudinal direction of the connector 200 extends in the second direction Z2 so a length of the connector 200 in the second direction Z2 is larger than a width of the connector 200 in the third direction Z3 and a thickness of the connector 200 in the first direction Z1.

The connector 200 may include the fastening portion C which forms an electrical connection with the input/output terminal 100, and a slider S which is slidable in the second direction Z2 between a first position P21, at which the slider S covers the fastening portion C, and a second position P22, at which the slider S exposes the fastening portion C. In the present specification, the first and second positions P21 and P22 of the slider S may refer to the positions of a manipulation portion S1, which is formed on a side of the slider S and exposed through a slider rail R of an accommodation block AB.

The fastening portion C may be inserted into the input/output terminal 100 through the insertion holes OP formed in the third and fourth sidewalls W3 and W4 of the input/output terminal 100, and may then be electrically connected to the upper surface of the coupling block CB. The fastening portion C, which is for making an electrical connection with the input/output terminal 100, may be formed at an end portion of the connector 200 which corresponds to a front end of the connector 200 in the second direction Z2.

The slider S may be slidable between the first and second positions P21 and P22 in the second direction Z2 in which the connector 200 extends. For example, the slider S may be slidable between the first position P21, at which the slider S covers the fastening portion C, and the second position P22, at which the slider S exposes the fastening portion C, such that the slider S may insulate the fastening portion C from the surrounding environment by covering the fastening portion C at the first position P21 and may be moved from the first position P21 to the second position P22 for exposing the fastening portion C, and thus, allowing electrical connection between the fastening portion C and the input/output terminal 100. For example, the connector 200 may form an electrical connection between the group of battery cells 10 connected to the input/output terminal 100 and another group of battery cells 10, and to this end, the connector 200 may be connected to the other group of battery cells 10 even before the connector 200 is connected to the input/output terminal 100. In this case, the slider S may cover the fastening portion C, such that the fastening portion C may not be exposed to the outside, and thus, even when an external conductor or a part of a person comes into contact with the connector 200, current may not flow to the external conductor or the part of the person. The slider S may include an insulating material, e.g., a resin material, to insulate the fastening portion C.

In an embodiment, the connector 200 may include the accommodation block AB connected to the fastening portion C in the second direction Z2, and the slider S may be assembled such that the slider S may slide outside of the accommodation block AB to the first position P21 along the slider rail R formed on the accommodation block AB to cover the fastening portion C, and may slide into the accommodation block AB to the second position P22 to expose the fastening portion C. In other words, the accommodation block AB may accommodate the slider S at the second position P22.

The connector 200 may include the fastening portion C and the accommodation block AB, which are sequentially arranged in the second direction Z2 from an end portion of the connector 200 corresponding to the front end of the connector 200, and a conductor CC, which is connected to the accommodation block AB. In other words, the connector 200 may include the fastening portion C, the accommodation block AB, and the conductor CC, which are sequentially arranged in the second direction Z2 from the end portion of the connector 200.

Although not shown in FIGS. 6 to 7B, the conductor CC may be covered and insulated by a covering. In this case, the covering is for insulating a remaining portion of the connector 200 other than the fastening portion C and the accommodation block AB, which are sequentially arranged in the second direction Z2 from the end portion of the connector 200 corresponding to the front end of the connector 200. For example, the covering may insulate the remaining portion of the connector 200 from the surrounding environment. In an embodiment, the covering may cover the conductor CC forming a core portion of the connector 200 to insulate the conductor CC from the surrounding environment. For example, the conductor CC forming the core portion of the connector 200 may extend in the second direction Z2 throughout the total length of the connector 200 from the end portion of the connector 200 corresponding to the front end of the connector 200 to the other end portion of the connector 200. For example, the conductor CC forming the core portion of the connector 200 may extend toward the end portion of the connector 200 in the second direction Z2, wherein a portion of the conductor CC located outside the covering may be insulated as being covered with the accommodation block AB, and an end portion of the conductor CC located outside the accommodation block AB may be exposed to the outside and may form the fastening portion C. The accommodation block AB and the covering may include an insulating material or different insulating materials. For example, the accommodation block AB may include a relatively hard insulating material, e.g., a plastic material, to form an accommodation space therein for the slider S, and in this case, the accommodation block AB may include the same insulating material as the insulating material included in the slider S. That is, in an embodiment, the slider S and the accommodation block AB configured to accommodate the slider S, while supporting the movement of the slider S, may include a hard insulating material, e.g., a plastic material. In addition, the covering may include a resin material coated on the conductor CC, which forms the core portion of the connector 200, and the resin material may be an insulating material softer than the material of the slider S or the accommodation block AB.

Referring to FIG. 8, the fastening member F is provided to couple the input/output terminal 100 and the connector 200 to each other for forming an electrical connection therebetween. For example, the fastening member F may be inserted through the fastening portion C of the connector 200 placed on the coupling block CB of the input/output terminal 100 and may then be coupled to the coupling block CB for coupling the coupling block CB and the fastening portion C to each other. For example, the fastening member F may include a screw F1 extending in the first direction Z1, and the screw F1 may include a head F1a on an end portion thereof and a thread F1b on the other end portion in the first direction Z1.

The fastening member F may be supported at the unfastened position P11 by the guide rail G of the input/output terminal 100 and may slide from the unfastened position P11 to the fastened position P12 while being guided by the guide rail G. In this case, as described above, the guide rail G may include a pair of guide rails G formed at positions facing each other in the second direction Z2, and the guide piece GP may be formed on both sides of the fastening member F in the second direction Z2 for being stably supported by the pair of guide rails G. As described above, the fastening member F may include the screw F1 which extends in the first direction Z1, and the guide piece GP which is formed on both sides in the second direction Z2. In an embodiment, the fastening member F may include a plate which extends in the second direction Z2 to form the guide piece GP, and the screw F1 which is configured to be inserted through and coupled to the plate. Thus, the fastening member F may have an overall structure in which the plate (guide piece GP) extends in the second direction Z2, and the screw F1 is inserted through and coupled to the plate in the first direction Z1. In an embodiment, the guide piece GP may include a pair of guide pieces GP on opposite sides of the fastening member F in the second direction, each of the pair of guide pieces GP may be configured to be inserted between the upper and lower guide rails, and each of the pair of guide pieces GP may engage a pair of guide rails at positions facing each other in the second direction.

As described above, according to the one or more of the above embodiments, the battery pack has an improved connection structure between the input/output terminal 100, which is connected to the group of battery cells 10, and the connector 200, which is connected to an external load, an external charger, or another group of battery cells, thereby making it possible to simplify the connection structure of the battery pack, reduce the number of components and costs of the battery pack, and improve the reliability of electrical connection of the battery pack.

In addition, according to one or more of the above embodiments, the battery pack is configured to improve the connection structure between the input/output terminal 100 and the connector 200 by fastening the input/output terminal 100 and the connector 200 to each other at a height between the upper end portion and the lower end portion of the input/output terminal 100 connected to the battery cells 10, such that the total height of the input/output terminal 100 and the connector 200, which are electrically connected to each other, may be adjusted to be equal to or less than the height of the input/output terminal 100, and the connection structure between the input/output terminal 100 and the connector 200 may be compact.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a battery cell;
   an input/output terminal electrically connected to the battery cell, the input/output terminal including an upper end portion and a lower end portion in a first direction, and a charge/discharge current of the battery cell being input and output through the input/output terminal;
   a connector electrically coupled to the input/output terminal, the connector including:
   a fastening portion coupled to the input/output terminal at a fastened height between the upper end portion and the lower end portion of the input/output terminal, the fastened height being a height at which the input/output terminal and the connector are fastened to each other in the first direction, and
   a slider which is slidable in a second direction crossing the first direction, between a first position, at which the slider covers the fastening portion, and a second position, at which the slider exposes the fastening portion; and
   a fastening member electrically coupling the input/output terminal and the connector to each other.

2. The battery pack as claimed in claim 1, wherein the input/output terminal includes:
   a guide rail defining the upper end portion of the input/output terminal; and
   a coupling block defining the lower end portion of the input/output terminal.

3. The battery pack as claimed in claim 2, wherein the guide rail includes an upper guide rail and a lower guide rail which face each other in the first direction.

4. The battery pack as claimed in claim 3, wherein the upper guide rail and the lower guide rail extend in a third direction crossing the first direction and the second direction, an extension length of the upper guide rail being greater than an extension length of the lower guide rail.

5. The battery pack as claimed in claim 3, wherein each of the upper guide rail and the lower guide rail includes an insulating material.

6. The battery pack as claimed in claim 3, wherein the fastening member includes:
   a guide piece configured to be inserted between the upper guide rail and the lower guide rail; and
   a screw extending in the first direction across the guide piece.

7. The battery pack as claimed in claim 6, wherein the guide piece includes a pair of guide pieces on opposite sides of the fastening member in the second direction, each of the pair of guide pieces being configured to be inserted between the upper and lower guide rails, and each of the pair of guide pieces engaging a pair of guide rails at positions facing each other in the second direction.

8. The battery pack as claimed in claim 2, wherein the coupling block includes an upper surface, the upper surface being a conductive surface configured to allow charge/discharge current flow therethrough.

9. The battery pack as claimed in claim 8, further comprising an insertion space into which the connector is inserted, the insertion space being above the upper surface of the coupling block.

10. The battery pack as claimed in claim 8, wherein the upper surface of the coupling block has a height corresponding to the fastened height.

11. The battery pack as claimed in claim 2, wherein the input/output terminal further includes sidewalls surrounding the coupling block and the fastening member.

12. The battery pack as claimed in claim 11, wherein the sidewalls include:
   first and second sidewalls which face each other in a third direction crossing the first direction and the second direction; and
   third and fourth sidewalls which face each other in the second direction,
   wherein an insertion hole for receiving the connector is in at least one of the third and fourth sidewalls, and wherein the first to fourth sidewalls form an external shape of the input/output terminal as a rectangular parallelepiped shape together with the upper end portion and the lower end portion of the input/output terminal.

13. The battery pack as claimed in claim 1, wherein the connector further includes:
an accommodation block; and
a slider rail on the accommodation block, the slider rail supporting movement of the slider.

14. The battery pack as claimed in claim 13, wherein:
when the slider is at the first position, the slider is outside the accommodation block and covers the fastening portion, and
when the slider is at the second position, the slider is accommodated in the accommodation block and exposes the fastening portion.

15. The battery pack as claimed in claim 13, wherein:
the fastening portion is at an end portion of the connector, the end portion corresponding to a front end of the connector in the second direction, and
the fastening portion and the accommodation block are sequentially arranged from the end portion of the connector.

16. The battery pack as claimed in claim 13, wherein the slider includes a manipulation portion exposed from the slider rail of the accommodation block.

17. The battery pack as claimed in claim 2, wherein:
the guide rail supports the fastening member at an unfastened position of the fastening member, and
the guide rail guides sliding of the fastening member from the unfastened position to a fastened position.

18. The battery pack as claimed in claim 2, wherein the guide rail extends in a third direction crossing the first direction and the second direction.

19. The battery pack as claimed in claim 2, wherein the guide rail includes a pair of guide rails at positions facing each other in the second direction.

20. The battery pack as claimed in claim 2, further comprising a conductive bar electrically connected to the battery cell and the coupling block.

21. The battery pack as claimed in claim 13, wherein:
a guide rail supports the fastening member at an unfastened position of the fastening member, and the guide rail guides sliding of the fastening member from the unfastened position to a fastened position.

22. The battery pack as claimed in claim 13, wherein a guide rail extends in a third direction crossing the first direction and the second direction.

23. The battery pack as claimed in claim 13, wherein a guide rail includes a pair of guide rails at positions facing each other in the second direction.

* * * * *